United States Patent Office 2,794,701
Patented June 4, 1957

2,794,701

AMMONIUM NITRATE OF REDUCED TENDENCY TO CAKING AND SETTING ON STORAGE AND METHOD OF PRODUCING SAME

Jack Ames, Ardrossan, and Edward Keith Pierpoint, Largs, Scotland, assignors to Imperial Chemical Industries Limited, London, England, a corporation of Great Britain No Drawing. Application July 2, 1956,
Serial No. 595,107

Claims priority, application Great Britain
September 9, 1955

11 Claims. (Cl. 23—103)

The present invention is concerned with a method of lowering the tendency towards caking and setting of ammonium nitrate and with providing ammonium nitrate having a greatly reduced tendency towards caking and setting to a hard mass on storage. The invention is also concerned with solid ammonium nitrate compositions which include said ammonium nitrate having a greatly reduced tendency towards caking and setting.

Ammonium nitrate is an intensely hygroscopic compound and its tendency to cake and set on storage, which is believed to be due to the formation of crystalline bridges from a saturated solution which is formed between adjacent particles of ammonium nitrate on absorption of moisture and which crystallises when changes occur in atmospheric conditions, is an extreme inconvenience in the handling of ammonium nitrate whether in bulk or in bags or in its use in explosives.

It is known that when ammonium nitrate is provided with a thin surface coating of certain aromatic dyestuffs, as for example by crystallisation from an aqueous solution containing said dyestuff in solution, the resulting ammonium nitrate at least in the crystal form IV exhibits a greatly reduced tendency to caking and setting, and ammonium nitrate treated with e. g. the ammonium or calcium salt of tri-sulphonated para-para-para-triaminotritolyl carbinol anhydride (i. e. the ammonium or calcium salt of tri-sulphonated New Magenta) has been used successfully in preventing the caking and setting of ammonium nitrate used for the production of explosive compositions. This dyestuff, as its name implies, is of a magenta colour. Although only a very small proportion of this dyestuff and the other sulphonated aromatic dyestuffs whose employment has been proposed is required the resulting ammonium nitrate has an intense colour. Moreover, when the thus treated ammonium nitrate has to be stored at temperatures exceeding 32.3° C. above which the ammonium nitrate is in crystal form III, the treatment is almost ineffective although an improvement is obtained when a surface active compound soluble in and having the property of reducing the surface tension of a saturated solution of ammonium nitrate is used in conjunction with the dyestuff.

Also there has been claimed inter alia in British Patent No. 743,602 to provide an ammonium nitrate of reduced tendency to caking and setting on storage consisting of discrete ammonium nitrate particles carrying on their surface a deposit comprising a salt, soluble in a saturated aqueous ammonium nitrate solution at 20° C., of at least one compound definable as a condensation product of 1 mol. of formaldehyde and 2 mols. of an unsubstituted naphthalenemonosulphonic acid, the amount of said salt being from 0.01% upwards based on the weight of the dry ammonium nitrate particles.

It has now been found that by providing the surfaces of ammonium nitrate particles with a deposit comprising a salt, soluble in a saturated aqueous ammonium nitrate solution at 20° C., of at least one compound definable as a condensation product of 1 mol. of formaldehyde and 2 mols. of a monomethylnaphthalenemonosulphonic acid it is possible to produce an ammonium nitrate of normal white appearance and which has a reduced tendency to caking and setting at temperatures up to at least 45° C. in a more pronounced manner than heretofore and that it is also possible to produce such ammonium nitrate which is also of low bulk density.

According to the present invention ammonium nitrate of reduced tendency to caking and setting on storage and of substantially normal white appearance consists of discrete ammonium nitrate particles carrying on their surfaces a deposit comprising a salt, soluble in a saturated aqueous ammonium nitrate solution at 20° C., of at least one compound definable as a condensation product of 1 mol. of formaldehyde and 2 mols. of monomethylnaphthalenemonosulphonic acid, the amount of said salt being from 0.025% upwards, and preferably at least 0.04%, based on the weight of the dry ammonium nitrate particles.

If desired said ammonium nitrate has a bulk density as low as 0.45 to 0.55 gram/cc.

According to the present invention the method for the production of ammonium nitrate of reduced tendency to caking and setting on storage and of substantially normal white appearance comprises effecting crystallisation of an aqueous solution of ammonium nitrate containing, reckoned on the weight of the dry ammonium nitrate particles, from 0.025% upwards, and preferably at least 0.04%, of a salt soluble in a saturated aqueous ammonium nitrate solution at 20° C. of at least one compound definable as a condensation product of 1 mol. of formaldehyde and 2 mols. of a monomethylnaphthalenemonosulphonic acid.

To produce an ammonium nitrate of the aforesaid kind having a bulk density of 0.45 to 0.55 gram/cc. said aqueous solution of ammonium nitrate preferably contains not more than 73% ammonium nitrate and 0.1% to 0.4%, and preferably 0.2%, of a salt as aforesaid, is allowed to crystallise, preferably by cooling to ambient temperature, while undergoing slow stirring, preferably as much mother liquor as possible is separated from the resulting crystals and the crystals thus obtained are dried, preferably at a low temperature for example in air at 40° to 50° C.

Said solution can be allowed to crystallise by slow cooling without stirring, or by rapid cooling without stirring, or by rapid cooling with gentle stirring, or by rapid cooling and shaking.

It is necessary to remove as much mother liquor as possible from the crystals formed and to dry them at a fairly low temperature to reduce re-solution of some of the crystals in the remaining mother liquor. If the moist crystals are dried at too high a temperature the bulk density increases.

If said aqueous solution of ammonium nitrate has a concentration of ammonium nitrate of above 75% the form in which the ammonium nitrate crystallises will be different to that at concentrations below 73% and the bulk density of the ammonium nitrate is likely to be above 0.6 gram/cc.

Alternatively according to the invention the method for the production of ammonium nitrate of reduced tendency to cake and set on storage and of substantially normal white appearance comprises spraying an aqueous solution of a salt soluble in a saturated ammonium nitrate solution at 20° C. of at least one compound definable as a condensation product of 1 mol. of formaldehyde and 2 mols. of a monomethylnaphthalenemonosulphonic acid over the surfaces of previously formed ammonium nitrate particles, so as to deposit thereon an amount of said salt not less than 0.025% based on the weight of the dry ammonium nitrate particles.

The monomethylnaphthalenemonosulphonic acids suitable for condensation with formaldehyde can be obtained by sulphonating monomethylnaphthalenes with sulphuric acid for instance at any temperature between 40° C. and 165° C. The monomethylnaphthalene may be either 1-methylnaphthalene or 2-methylnaphthalene or a mixture of both. The product of monosulphonation with sulphuric acid at a temperature within this preferred range consists of one or more of several different monomethylnaphthalenemonosulphonic acid isomers depending on which monomethylnaphthalene is used and on the temperature at which the monosulphonation has been carried out.

Amongst the isomers stated in the literature to be formed under such conditions are 1-methylnaphthalene-3-sulphonic acid, 1-methylnaphthalene-4-sulphonic acid, 1-methylnaphthalene-5-sulphonic acid, 1 - methylnaphthalene-6-sulphonic acid, and 1-methylnaphthalene-7-sulphonic acid, from 1-methylnaphthalene; and 2-methylnaphthalene-6-sulphonic acid, 2-methylnaphthalene-7-sulphonic acid and 2-methylnaphthalene-8-sulphonic acid, from 2-methylnaphthalene, the proportions of the isomers depending inter alia on the sulphonation temperature.

For the condensation with formaldehyde it is unnecessary to isolate any particular methylnaphthalenemonosulphonic acid isomer since the crude monosulphonation reaction products obtained by monosulphonating either of the two methylnaphthalenes or a mixture of these with sulphuric acid at any temperature between 40° C. and 165° C. will give a satisfactory product. It is preferable to use the crude monosulphonation products since the expense of isolating individual chemical isomers is thereby avoided. The crude formaldehyde condensation products of monosulphonated products of the methylnaphthalenes with sulphuric acid which are most easily soluble in aqueous ammonium nitrate solutions and which are most effective, are those obtained when the sulphonation temperature is not below 115° C. Some charring is evident when the sulphonation temperature approaches 165° C. but at temperatures up to 135° C. products of good colour are obtained. Thus, preferably the sulphonation temperature with the sulphuric acid is from 115° C. to 135° C.

In monosulphonation reactions with sulphuric acid it is usual to employ an excess of sulphuric acid over the theoretical quantity. Disulphonation products are not produced to any extent as oleum is required for disulphonation. The acid catalyst required for the condensation reaction with the formaldehyde may be provided by the acidity of the crude sulphonated reaction product.

The formaldehyde condensation reaction mixture is advantageously well mixed at a temperature substantially below the temperature at which the condensation reaction is ultimately conducted which may conveniently be from 85° C. to 95° C. During the progress of the reaction the viscosity of the solution increases substantially. When the reaction is complete, as indicated by the fall in the formaldehyde concentration, the reaction mixture is allowed to cool somewhat and is neutralised with the base to be used to transform the condensation product into its salt, e. g. a solution of sodium hydroxide, potassium hydroxide or ammonia. The crude solution may then be evaporated to dryness and the resulting friable solid used as such or redissolved as required.

Whereas ammonium nitrate in crystal forms III and IV normally crystallises from saturated solution as [110] prisms or needles, the presence of small concentrations of the aforesaid salts in the crystallising solution results in the formation of laths, plates, or scales or very fine hair-like crystals. These modified crystals are of reduced mechanical strength and thus it is assumed that the strength of the bridges of recrystallised material which form between adjacent particles of ammonium nitrate in the presence of said salts is reduced.

The effect of said salts is quite different from that of conventional dusting agents, whether or not possessed of hydrophilic or hydrophobic properties, not only because the salts used according to the invention modify the crystal habit of the ammonium nitrate, but also because they are effective in much smaller amounts, both under ordinary storage conditions and when exposed to abnormally humid atmospheres and their effect is much more lasting. The treatment is effective at temperatures up to at least 45° C.

The invention may be put into effect by dissolving the said salt in the aqueous solution or aqueous melt from which the ammonium nitrate is obtained in solid form, for example by graining with mechanical agitation or by spray crystallisation. In the graining process the ammonium nitrate concentration and temperature of said aqueous solution are sufficiently high to enable the heats of crystallisation and transition to evaporate the water during the graining with mechanical agitation.

Another method of application of the aforesaid salt is to dissolve it in water and spray the resulting solution over the surface of the previously formed ammonium nitrate particles, and bring about the evaporation of the water and preferably subsequent cooling to a temperature below 32.3° C. while keeping the ammonium nitrate particles in motion.

In most ammonium nitrate manufacturing processes the solid ammonium nitrate particles usually first appear in abundance from the hot ammonium nitrate solution or melt at a temperature exceeding 32.3° C. and heretofore it was normally desirable that the ammonium nitrate particles should be continuously agitated during their drying and cooling until the temperature fell below 32.3° C. It is not necessary to do this for ammonium nitrate particles carrying the deposit of a salt of a compound definable as aforesaid although it is still preferred continuously to agitate the thus treated ammonium nitrate particles to below 32.3° C. as the anti-setting effect above 32.3° C. is less than below 32.3° C.

The following tables record the comparative data obtained at a temperature of 39° C. and at a temperature of 15° C. respectively in setting tests expressed in terms of hardness values for untreated ammonium nitrate, for ammonium nitrate treated with a salt of a compound defined as aforesaid, for ammonium nitrate treated with a salt of a compound definable as a condensation product of 1 mol. of formaldehyde and 2 mols. of an unsubstituted naphthalenemonosulphonic acid, and for ammonium nitrate treated with acid magenta and sodium oleyl para-anisidine orthosulphonate.

The setting tests are carried out as follows.

The particular sample of treated or untreated ammonium nitrate is packed into a cylindrical porous paper cartridge of approximately 2½" by 1⅛". This is done by introducing equal amounts of the ammonium nitrate in two stages and pressing the ammonium nitrate in the cartridge at each stage under a load of 20 lb. weight for 30 seconds. The cartridge is weighed and is then placed over a suitable aqueous solution having the desired vapour pressure so as to give the required relative humidity and the cartridge is allowed to pick up moisture. On reaching a desired increase in weight the moist cartridge is weighed and dried over sulphuric acid. The dried cartridge is again weighed. The paper wrapping is removed and the cartridge is halved transversely and each half is laid longitudinally on a flat surface. A vertical metal rod ⁵⁄₁₆" diameter is then allowed to rest on a half cartridge and weights are added to the rod at 15 second intervals. The load which is required to break each half cartridge is noted and the mean breaking load for the cartridge is plotted against the percentage moisture which is lost by the cartridge during the drying.

The interpolated hardness values for pick-up and loss of 0.2%, 0.3%, 0.5% and 1.0% moisture at 39° C. are shown in the following table.

|  | Pick up and loss of moisture | | | |
| --- | --- | --- | --- | --- |
|  | 0.2% | 0.3% | 0.5% | 1.0% |
|  | Lb. | Lb. | Lb. | Lb. |
| Ammonium nitrate treated as hereinafter described in Example 1 with 0.05% of a sodium salt of a compound defined as aforesaid and as prepared in said Example 1 | 5 | 7 | 8 | 14 |
| Ammonium nitrate+0.05% of a sodium salt of a compound definable as a condensation product of 1 mol. of formaldehyde and 2 mols. of an unsubstituted β-naphthalene-monosulphonic acid | 9 | 12 | 15 | >20 |
| Ammonium nitrate+0.045% Acid Magenta+0.005% sodium oleyl para-anisidine orthosulphonate | 14 | 18 | >20 | >20 |
| Untreated ammonium nitrate | >20 | >20 | >20 | >20 |

The interpolated hardness values for pick up and loss of 0.2%, 0.4%, 0.6% and 0.8% moisture at 15° C. are shown in the following table.

|  | Pick up and loss of moisture | | | |
| --- | --- | --- | --- | --- |
|  | 0.2% | 0.4% | 0.6% | 0.8% |
|  | Lb. | Lb. | Lb. | Lb. |
| Ammonium nitrate treated as hereinafter described in Example 1 with 0.05% of a sodium salt of a compound defined as aforesaid and as prepared in said Example 1 | 2 | 4 | 5 | 8 |
| Ammonium nitrate+0.05% of a sodium salt of a compound definable as condensation product of 1 mol. of formaldehyde and 2 mols. of an unsubstituted β-naphthalene monosulphonic acid | 3 | 5 | 7 | 16 |
| Ammonium nitrate+0.045% Acid Magenta+0.005% sodium oleyl para-anisidine orthosulphonate | 1 | 1 | 1½ | 2 |
| Untreated ammonium nitrate | 10 | 16 | >20 | >20 |

The following examples illustrate how ammonium nitrate according to the invention can be produced. The parts and percentages are by weight.

*Example 1*

A substantially white ammonium nitrate having a reduced tendency to setting on storage at temperatures between 10° and 45° C. is prepared using a crystal habit modifying agent prepared as follows.

Commercial 1-methylnaphthalene (200 parts) containing approximately 70% 1-methylnaphthalene and 30% 2-methylnaphthalene, is heated with stirring to 100° C. and concentrated sulphuric acid (S. G. 1.84; 200 parts) is run in slowly so that the temperature of the reaction mixture is maintained between 100° and 120° C. The mixture is stirred at 120°–125° C. for six hours and is then cooled to 60° C. whereupon water (60 parts) is added. After cooling the diluted sulphonation mixture to 50° C. an aqueous solution of formaldehyde (37% w./v.; 57 parts) is added slowly and the reaction mixture is allowed to cool with stirring for two hours. The mixture is then raised to 98° to 100° C. over thirty minutes and is maintained at this temperature with stirring for a further three hours. On cooling, the viscous solution is neutralized with sodium hydroxide and the product is evaporated to dryness.

A solution of the crystal habit modifying agent thus obtained, (0.06 part) in water (0.3 part), is added dropwise to ammonium nitrate (100 parts) obtained by a spray crystallisation process, the ammonium nitrate particles being agitated in such a manner that they are evenly moistened with a solution of the said product. The moisture is removed by evaporation whilst the mixture is still agitated.

The resulting ammonium nitrate may be stored in cardboard boxes with loose fitting lids at atmospheric temperatures of 15° to 20° C. for a period of at least 3 months with only slight setting.

When the ammonium nitrate treated in accordance with this example is put into a sack and the sack is stored for three days at a time alternately at 15° to 20° C. and in a hot cupboard at 38° to 40° C. for a period at least up to 2 months the ammonium nitrate remains free from the very hard setting normally experienced with untreated ammonium nitrate under these conditions. Although some setting does occur the lumps formed are easily crushed.

*Example 2*

A substantially white ammonium nitrate which has reduced tendencies to setting and caking on storage at temperatures between 10° and 45° C. as indicated by setting tests as hereinbefore described is prepared using the crystal habit modifying agent prepared as in Example 1 as follows.

An aqueous ammonium nitrate solution of 97% ammonium nitrate content is contained in an incorporator or graining kettle and allowed to crystallise with continuous agitation. When crystallisation has proceeded to give a magma of crystals moistened with ammonium nitrate solution a 20% aqueous solution of said crystal habit modifying agent is added dropwise without interrupting the agitation, in such an amount that the final treated product contains 0.1% of its weight of agent, concentrated on the surfaces of the resulting ammonium nitrate particles. The heat given out during the crystallisation and transition of the ammonium nitrate aids the evaporation of the water present.

*Example 3*

An aqueous ammonium nitrate solution of 97% ammonium nitrate content is contained in an incorporator or graining kettle and is allowed to crystallise with continuous agitation. When the crystallisation has proceeded to give a magma of crystals moistened with ammonium nitrate solution the crystal habit modifying agent as prepared in Example 1 in an amount equal to 0.1% of the weight of the ammonium nitrate is added as a fine powder which is evenly distributed over the agitated salt and which slowly dissolves in the remaining mother liquor. The heat evolved by the crystallisation and transition of the ammonium nitrate aids the removal of the water by evaporation. The dry product has a reduced tendency to setting and caking compared with untreated ammonium nitrate when stored at temperatures between 10° and 45° C.

*Example 4*

A substantially white ammonium nitrate of reduced tendency to setting and caking on storage at temperatures between 10° C. and 45° C. is prepared as described in Example 1 with the exception that the crystal habit modifying agent used is prepared using paraformaldehyde (22 parts) in place of an aqueous solution of formaldehyde as described in the preparation of said agent for Example 1, and a correspondingly larger amount of water is used to dilute the sulphonation mixture.

The resulting ammonium nitrate may be stored in cardboard boxes with loose fitting lids at atmospheric temperatures of 15° to 20° C. for a period of at least 3 months with only slight setting.

When the ammonium nitrate treated in accordance with this example is put into a sack and the sack is stored in a hot cupboard at 38° to 40° C. for several days the ammonium nitrate is free from the hard setting normally experienced with untreated ammonium nitrate. Any lumps formed in the course of this storage are easily broken.

*Example 5*

A substantially white ammonium nitrate of reduced tendency to setting and caking on storage at temperatures between 10° and 45° C. as indicated by setting tests hereinbefore described is prepared as described in Example 1 except that the crystal habit modifying agent used is prepared by maintaining the sulphonation temperature of the technical 1-methylnaphthalene at 160° to 165° C. for six hours.

*Example 6*

A substantially white ammonium nitrate of reduced tendency to setting and caking on storage at temperatures between 10° and 45° C. as indicated by setting tests as hereinbefore described is prepared as described in Example 2 except that the crystal habit modifying agent used is that prepared as described in Example 5.

*Example 7*

A substantially white ammonium nitrate showing a reduced tendency to setting and caking when stored at temperatures between 10° and 45° C. as indicated by setting tests as hereinbefore described is prepared as described in Example 1 with the exception that the crystal habit modifying agent used is prepared as follows.

Technical 1-methylnaphthalene, 25 parts, containing approximately 70% 1-methylnaphthalene and 30% 2-methylnaphthalene, and concentrated sulphuric acid (S. G. 1.84; 26 parts), are mixed together at room temperature and stirred at 40–45° C. for seven hours, after which time further sulphuric acid (S. G. 1.84; 26 parts), is added and the stirring continued for another seven hours at 40° to 45° C. The sulphonation mixture is then diluted with water (40 parts) and cooled to 35° C. whereupon paraformaldehyde (2.2 parts) is added. The rapidly stirred mixture is kept at between 35° C. and 45° C. for three hours; the internal temperature is then slowly raised to 95° to 100° C. during one hour and is kept at this temperature for a further three hours, vigorous stirring being maintained throughout the condensation with the formaldehyde. The reaction mixture is allowed to stand for 12 hours at room temperature and the lower layer of aqueous sulphuric acid is separated off and the residual condensate dissolved in 250 parts of water. The hot solution of the condensate is treated with sufficient barium carbonate (approximately 14 parts) to remove residual sulphuric acid and the precipitated barium sulphate is removed by filtration through a layer of kieselguhr or similar filtering agent. The filtrate is neutralised to pH 7 with sodium hydroxide and the solution evaporated to dryness.

*Example 8*

A substantially white ammonium nitrate of reduced tendency to setting and caking on storage at temperatures between 10° and 45° C. as indicated by setting tests as hereinbefore described is prepared as described in Example 1 except that the agent used is prepared from pure 1-methylnaphthalene instead of technical 1-methylnaphthalene.

*Example 9*

A substantially white ammonium nitrate of reduced tendency to setting and caking when stored at temperatures between 10° and 45° C. as indicated by setting tests as hereinbefore described is prepared as described in Example 2 except that the agent used is prepared as described in Example 8.

*Example 10*

A substantially white ammonium nitrate of reduced tendency to setting and caking when stored at temperatures between 10° and 45° C. as indicated by setting tests as hereinbefore described is prepared as described in Example 1 except that the agent used is prepared as follows.

2-methylnaphthalene (20 parts) is warmed to 40° C. and concentrated sulphuric acid (S. G. 1.84; 20 parts) at room temperature is run in over ten minutes. The reaction mixture is stirred for eight hours at an internal temperature of 40° C. The milky suspension so formed is treated with water (10 parts) and stirred for 30 minutes whereupon paraformaldehyde (2.3 parts) is added, and the stirring continued for a further three hours at 40° C. The temperature is then raised to 95° to 100° C. over 30 minutes and a further 10 parts of water is added to the now viscous mixture, which is kept at 95° to 100° C. for a further three hours with continuous stirring. The condensation mixture is allowed to cool and is dissolved in 250 parts of water and the solution filtered through a pad of kieselguhr to remove insoluble matter. The hot filtrate is treated with barium carbonate (about 12 parts) to remove excess sulphuric acid and the precipitate of barium sulphate is removed by filtration through kieselguhr or similar filtering agent. The filtrate is neutralised with sodium hydroxide and is evaporated to dryness.

*Example 11*

A substantially white ammonium nitrate having a reduced tendency to setting and caking when stored for several weeks in cardboard boxes with loose fitting lids at temperatures between 10° and 45° C. is prepared as described in Example 1 except that the crystal habit modifying agent used is prepared as follows.

2-methylnaphthalene (100 parts) is heated to 90° C. and is mechanically stirred. Concentrated sulphuric acid (S. G. 1.84; 100 parts) at room temperature is added slowly. The temperature of the mixture rises to 100° C. during the addition of the acid and is maintained at 95° to 100° C. for 6 hours. On cooling to room temperature the sulphonation mixture solidifies and the product is dissolved in water (60 parts) with warming. The solution is cooled to 65° C. whereupon paraformaldehyde (11 parts) is added with vigorous stirring. The mixture is stirred for two hours, the temperature being allowed to fall. A crystalline deposit separates out when the temperature drops below about 45° C., but this precipitate does not interfere with the stirring. The temperature is then slowly raised to 95° to 100° C. during 30 minutes and is maintained at 95° to 100° C. for a further 3 hours, the mixture being stirred continuously throughout the condensation. The viscous solution is diluted with water (500 parts) and the hot solution treated with barium carbonate (60 parts) to remove excess sulphuric acid and the barium sulphate is separated by filtration through kieselguhr. The filtrate is neutralised with sodium hydroxide and evaporated to dryness.

*Example 12*

A substantially white ammonium nitrate having a reduced tendency to setting and caking on storage in cardboard boxes with loose fitting lids at temperatures between 10° and 45° C. is prepared as described in Example 2 except that the crystal habit modifying agent used is prepared as described in Example 11.

*Example 13*

A substantially white ammonium nitrate having a reduced tendency to setting and caking on storage at temperatures between 10° and 45° C. as indicated by setting tests as hereinbefore described is prepared as described in Example 1, except that the agent used is prepared as described in Example 11 and that the 2-methylnaphthalene is sulphonated at 160° to 165° C. for 6 hours.

*Example 14*

An aqueous solution of ammonium nitrate containing 85% by weight of ammonium nitrate is allowed to cool from 80° C. to about 55° C. in a rotating tubular crystalliser and the crystalline salt is separated from the mother liquor. The moist crystals of ammonium nitrate so obtained (100 parts) contained in a suitable apparatus, are treated, whilst being agitated, with a solution of a crystal habit modifying agent (0.06 part) prepared as described in Example 1, in water (0.3 part) in such a manner that a solution of said agent is evenly distributed over the surfaces of the crystals. The moisture is then removed by evaporation whilst the treated ammonium nitrate crystals are agitated.

The resulting ammonium nitrate has a reduced tendency to caking and setting on storage at temperatures between 10° and 45° C. as indicated by setting tests as hereinbefore described.

Example 15

A substantially white ammonium nitrate which has a reduced tendency to setting and caking on storage at temperatures between 10° C. and 45° C. as indicated by setting tests as hereinbefore described is prepared as described in Example 1 except that the crystal habit modifying agent used is prepared as follows.

The barium salt of 2-methylnaphthalene-8-sulphonic acid is prepared by sulphonating 2-methylnaphthalene with sulphuric acid at 40° C. and neutralising the reaction mixture with barium carbonate, as described in the literature. The free acid is obtained from the recrystallised salt by careful precipitation of the barium with sulphuric acid in the well-known manner. A mixture containing 10 parts of the free 2-methylnaphthalene-8-sulphonic acid so obtained, 4 parts of water, 0.8 part of paraformaldehyde and 1.6 parts of concentrated sulphuric acid is stirred for two hours at ordinary temperature and then at 80° to 90° C. for a further three hours. The hot viscous solution is diluted with 10 parts of cold water, neutralised with sodium hydroxide solution and the product isolated by evaporation to dryness.

Example 16

A 73% solution of ammonium nitrate containing 0.2% on the weight of the ammonium nitrate of the crystal habit modifying agent prepared as described in Example 1 is cooled with slow stirring to about 15° C. The modified crystals so formed are separated by centrifuging from their mother liquor. The moist product so obtained is then sieved through an 8 B. S. sieve and dried in warm air (40° to 50° C.). The product so obtained is very free flowing and has a very greatly reduced tendency to setting on storage at temperatures between 10° and 45° C. The product is also of low bulk density, namely between 0.45 and 0.55 gram/cc. under a load of 20 lb./sq. in.

The resulting ammonium nitrate may be stored in sacks at temperatures of 15° to 20° C. for a period of at least 3 months without setting and at 40° C. with very little setting for at least up to 3 months. In setting tests at 39° C. as hereinbefore described the average breaking load is 6 lbs. for a pick-up and loss of moisture of 2%.

Example 17

A solution prepared from 584 grams of ammonium nitrate and 216 grams of water containing 1.2 grams of an agent prepared as described in Example 5 is allowed to cool to about 17° C. without disturbance. The highly modified ammonium nitrate crystals are separated from the mother liquor in a centrifuge and sieved moist through a No. 8 B. S. sieve and dried at 40° C. The product has a bulk density of about 0.5 gram/cc. and is free flowing and very resistant to setting on storage in calico bags at temperatures of from 10° to 45° C.

Example 18

A solution prepared from 584 grams of ammonium nitrate and 216 grams of water containing 1.2 grams of an agent prepared as described in Example 11 is cooled to about 20° C. over a period of about 30 minutes whilst being slowly stirred. The crystalline ammonium nitrate is separated from the mother liquor in a centrifuge and is sieved moist through a No. 8 B. S. sieve and dried at 40° C. The product has a bulk density of about 0.53 gram/cc. and is free flowing and very resistant to setting when stored in calico bags at temperatures of from 10° C. to 45° C.

Example 19

One hundred parts of kieselguhr are thoroughly moistened with an aqueous solution of 20 parts of the crystal habit modifier prepared as described in Example 1, and the mixture is dried to an easily dispersible powder. This powder (3 parts) is added to 100 parts of spray crystallised ammonium nitrate in a mechanical mixer or other suitable apparatus and the mixture agitated until the kieselguhr, which contains the absorbed agent, is evenly distributed throughout the salt.

This ammonium nitrate has the advantage over ammonium nitrate treated with kieselguhr alone, in that it resists setting and caking on storage at a temperature between 10° and 45° C. over a greater range of moisture pick-up and loss.

It has to be observed that whereas ammonium nitrate provided for instance with a coating of acid magenta has reduced setting properties at temperatures above 32.3° C., in addition to its reduced setting properties below 32.3° C., if the coating includes for instance sodium oleyl para-anisidine orthosulphonate, at least sufficient for the few hours which are required in manufacture when the ammonium nitrate is collected in bags for the temperature of the ammonium nitrate in the bags to drop to below 32.3° C., the extent of setting of the ammonium nitrate of the present invention which occurs on prolonged storage between 10 and 45° C. is considerably less than that for untreated ammonium nitrate.

What we claim is:

1. Ammonium nitrate of reduced tendency to caking and setting on storage and of substantially normal white appearance comprising discrete ammonium nitrate particles carrying on their surfaces a deposit comprising a salt, soluble in a saturated aqueous ammonium nitrate solution at 20° C., of at least one condensation product of 1 mol. of formaldehyde and 2 mols of a monomethylnaphthalenemonosulphonic acid, the amount of said salt being from 0.025% upwards based on the weight of the dry ammonium nitrate particles.

2. Ammonium nitrate as claimed in claim 1 wherein the amount of said salt is at least 0.04%.

3. Ammonium nitrate as claimed in claim 1 having a bulk density of 0.45 to 0.55 gram/cc.

4. Ammonium nitrate as claimed in claim 1 wherein said condensation product is derived by reacting with formaldehyde the monosulphonation reaction product obtained by reacting a member of the group consisting of 1-methylnaphthalene and 2-methylnaphthalene, with sulphuric acid at a temperature between 40° and 165° C.

5. Ammonium nitrate as claimed in claim 4 wherein said temperature is between 115° and 135° C.

6. Ammonium nitrate as claimed in claim 4 wherein said condensation product is derived by reacting with formaldehyde said monosulphonation reaction product at a temperature from 85° to 95° C.

7. A method for the production of ammonium nitrate of reduced tendency to caking and setting on storage and of substantially normal white appearance which comprises effecting crystallisation of an aqueous solution of ammonium nitrate containing, reckoned on the weight of the dry ammonium nitrate particles, from 0.025% upwards of a salt soluble in a saturated aqueous ammonium nitrate solution at 20° C. of at least one condensation product of 1 mol. of formaldehyde and 2 mols. of a monomethylnaphthalenemonosulphonic acid.

8. A method as claimed in claim 7 wherein crystallisation is effected of an aqueous solution of ammonium nitrate containing at least 0.04% of said salt.

9. A method as claimed in claim 7 wherein said aqueous solution of ammonium nitrate contains not more than 73% ammonium nitrate and 0.1% to 0.4% of said salt.

10. A method for the production of ammonium nitrate of reduced tendency to caking and setting on storage of substantially normal white appearance which comprises spraying an aqueous solution of a salt soluble in a saturated aqueous ammonium nitrate solution at 20° C. of at least one condensation product of 1 mol. of formaldehyde and 2 mols. of a monomethylnaphthalenemonosulphonic acid over the surfaces of previously formed ammonium nitrate particles so as to deposit thereon an amount of said salt not less than 0.025% based on the weight of the dry ammonium nitrate particles.

11. A method as claimed in claim 7 wherein said condensation product is derived by reacting with formaldehyde the monosulphonation reaction product obtained by reacting a member of the group consisting of 1-methylnaphthalene and 2-methylnaphthalene, with sulphuric acid at a temperature between 40° and 165° C.

References Cited in the file of this patent

UNITED STATES PATENTS

| | | |
|---|---|---|
| 2,502,996 | Rohner | Apr. 4, 1950 |
| 2,616,786 | Whetstone | Nov. 4, 1952 |
| 2,616,787 | Whetstone | Nov. 4, 1952 |
| 2,720,446 | Whetstone | Oct. 11, 1955 |